Dec. 25, 1945.  B. W. HOWARD  2,391,626
TIRE TOOL
Filed Dec. 15, 1943

INVENTOR.
BURTON W. HOWARD, DECEASED,
RUBY L. HOWARD, ADMINISTRATRIX,
BY
*CKnowles.*
ATTORNEYS.

Patented Dec. 25, 1945

2,391,626

UNITED STATES PATENT OFFICE 2,391,626

TIRE TOOL

Burton W. Howard, deceased, late of Aguanga, Calif., by Ruby L. Howard, administratrix, Aguanga, Calif.

Application December 15, 1943, Serial No. 514,415

1 Claim. (Cl. 157—6)

This invention relates to a tool designed primarily for the purpose of removing tires from their wheels, one of the objects being to provide a tool having means whereby it can be anchored securely to the wheel while at the same time a portion of the tool is exerting a prying action upon the tire sufficient to displace the tire relative to the wheel rim and permit its removal therefrom.

A further object is to provide a tool which is adjustable so that it can be anchored either to the hub portion of a wheel or within the bolt openings of the wheel, according to the most advantageous position for the work to be done.

A still further object is to provide a tool which can be utilized for lifting the wheel into position to properly locate the bolt openings so as to allow the bolts to be inserted readily thereinto.

Another object is to provide a tool the anchoring and prying portions of which are adjustable relative to each other so that the tool is thus adaptable to wheels of different diameters.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1:
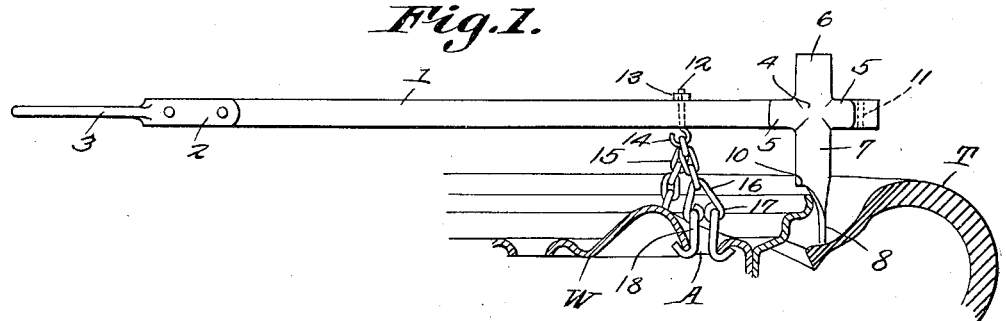
Figure 1 is a side elevation of the tool, the same being shown in position to pry a tire away from its rim, the tool being shown anchored in one of the bolt holes of the wheel.
Figure 2:
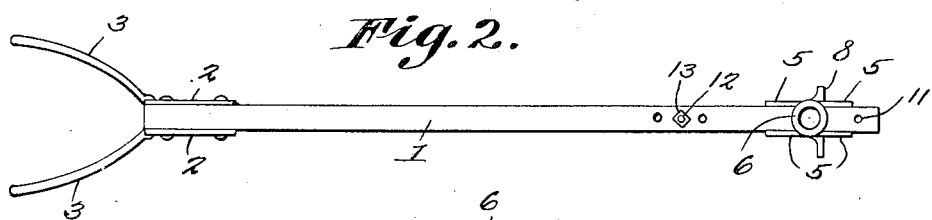
Figure 2 is a top plan view of the tool.
Figure 3:
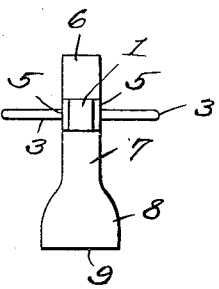
Figure 3 is an end elevation.

Referring to the figures by characters of reference, 1 designates an elongated handle constituting a lever. This handle can be made of wood or of a metal tube as preferred. Plates 2 are attached to opposite sides of the handle near one end and have curved prongs extending therefrom as shown at 3, these plates and prongs when assembled cooperating to provide a fork with a portion to engage beneath an upstanding tire so that the tire and its wheel can be pried or lifted for the purpose of centering the same on the hub of a wheel to which the wheel is to be attached.

A sleeve 4 is mounted on handle 1 and is adapted to slide therealong to any desired position. This sleeve includes oppositely extending pairs of small plates or wings 5 joined at their upper edges by an upstanding head 6 and at their lower edges by a depending shank 7. This sleeve and the parts integral therewith can be brought to any desired position on the handle and by making the handle angular in cross-section, the sleeve will be held against rotation relative thereto. Shank 7 is flattened at its lower portion to form a blade 8 having a straight bottom edge 9 and this blade is offset relative to the shank so that a shoulder or overhang 10 is thus formed by the shank adjacent to the top of the blade.

Any desired number of openings 11 are extended through the handle and any one of these openings is adapted to receive a bolt 12 held in place by a nut 13 at its upper end. The lower end of the bolt is provided with a hook 14 and this hook engages any one of the links of a chain 15. One end of the chain has a yoke 16 provided with terminal eyes 17 which are oppositely disposed, and suspended from these eyes are hooks or grapples 18 the free ends of which are extended away from each other.

Figure 4:
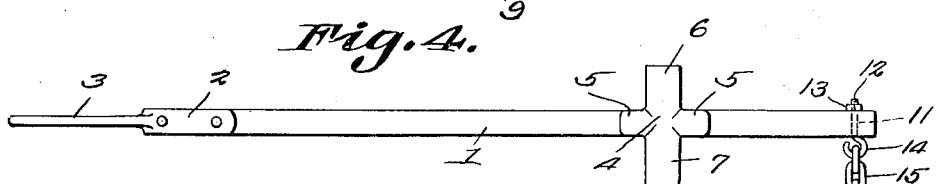
Figure 4 is a side elevation showing the prying and anchoring elements adjusted to positions differing from those shown in Figure 1.
Figure 5:
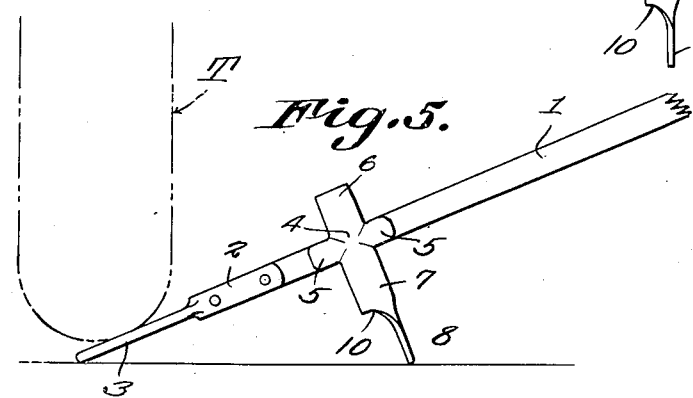
Figure 5 is a side elevation of the tool in position to lift the wheel to facilitate its attachment to the wheel hub.

With the shank 7 and the anchored chain 15 located relative to each other as shown in Fig. 1, the tool can be employed for prying between a tire and a wheel rim by inserting the hooks 18 into a bolt opening A in a wheel W and then moving the shank 7 to a point where its shoulder 10 will overlie the edge of the rim and the blade 8 will press against the tire close to the rim. The point of connection between the chain and the handle 1 becomes the fulcrum of the tool when the fork end is pulled upwardly by the user and thus the shank 7 is forced downwardly, causing the blade to thrust against the adjacent portion of the tire T so as to push it away from the rim as shown. The edge of the shank is extended along curved lines so as to merge into the shoulder 10. Thus as the tool is forced downwardly against the tire, it is swung outwardly by the cooperation of the curved faces with the edge of the wheel rim with the result that the tire is both loosened and given an outward thrust. Under some conditions it is more desirable to change the tool so that hooks can be anchored in the hub opening and the forked end of the tool is pushed so that the blade 8 thus transmits thrust at a point between the fulcrum and the point of application of force. In order to arrange the parts as shown in Fig. 4 whereby this result can be obtained, it becomes merely necessary to detach the bolt 12, move the sleeve 4 to the desired position on the handle, and then insert the bolt in the opening 11 nearest the end of the handle.

The tool can also be used for the purpose of prying upwardly the tire and its wheel when the wheel is ready to be fastened to the hub. For this purpose the blade 8 becomes a fulcrum and the fork 3 is inserted under the tire. By then pushing downward on the other end portion of the handle, said handle will operate as a lifting lever and the wheel can readily be raised into proper position to receive the fastening bolts.

Having described only typical preferred forms and applications of the invention, applicant does not wish to be limited or restricted to the specific details herein set forth, but wishes to reserve to himself any variations or modifications that may appear to those skilled in the art or fall within the scope of the following claim.

What is claimed is:

A tire tool including a handle, a shank reversibly mounted adjacent one end of the handle and extended at an angle to said handle, a tire bead engaging blade at one end of the shank positioned in a plane extending transversely of the handle, and a wheel rim engaging cam surface extended along curved lines from one face of the blade to one side of the shank, and means for anchoring the handle for pivotal movement to a wheel, said means being located adjacent the cam side of the blade.

RUBY L. HOWARD,
*Administratrix of the Estate of Burton W. Howard, Deceased.*